(12) United States Patent
Belhaj

(10) Patent No.: US 6,564,179 B1
(45) Date of Patent: May 13, 2003

(54) DSP EMULATING A MICROCONTROLLER

(75) Inventor: Said O. Belhaj, Coplay, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/360,689

(22) Filed: Jul. 26, 1999

(51) Int. Cl.⁷ .......................... G06F 15/00; G06F 9/455

(52) U.S. Cl. ......................... 703/26; 703/24; 703/25; 712/28; 712/31; 712/34; 712/35; 712/36; 712/209; 712/203; 712/227

(58) Field of Search .......................... 703/23, 24, 25, 703/26; 712/209, 227, 203, 228, 34, 35, 36, 28, 31, 200

(56) References Cited

U.S. PATENT DOCUMENTS

| | | | | |
|---|---|---|---|---|
| 4,992,934 A | * | 2/1991 | Portanova et al. | 703/27 |
| 5,283,900 A | * | 2/1994 | Frankel et al. | 703/26 |
| 5,291,614 A | * | 3/1994 | Baker et al. | 712/35 |
| 5,313,618 A | * | 5/1994 | Pawloski | 703/28 |
| 5,329,471 A | * | 7/1994 | Swoboda et al. | 703/13 |
| 5,438,672 A | * | 8/1995 | Dey | 703/23 |
| 5,442,789 A | * | 8/1995 | Baker et al. | 709/105 |
| 5,450,607 A | * | 9/1995 | Kowalczyk et al. | 708/524 |
| 5,481,684 A | * | 1/1996 | Richter et al. | 703/26 |
| 5,481,693 A | * | 1/1996 | Blomgren et al. | 703/26 |
| 5,574,927 A | * | 11/1996 | Scantlin | 703/23 |
| 5,630,153 A | * | 5/1997 | Intrater et al. | 710/110 |

(List continued on next page.)

OTHER PUBLICATIONS

Martin et al., "A RISC Architecture with Uncompromised Digital Signal Processing and Microcontroller Operation", IEEE 1998.*

Walsh, "Piccolo—The ARM Architecture for Signal Processiing: an Innovative New Architecture for Unified DSP and Microcontroller Processing", Proc. ICSPAT96, vol. 1, pp 658–663, 1996.*
Bursky, "Merged Embedded Controller and DSP Designs Simplify Systems", Electronic Design, Oct. 1997.*
Williams, "DSP applications are attracting the makers of real–time operating systems", Electronic Design, 1997.*
Lammers, "TeraGen architecture primes single engine for multiple instruction sets", EE Times, Jan. 1999.*
Lucent Technologies Inc., "Flash DSP 1650 Digital Signal Processor," Preliminary Data Sheet, Jan. 1998.

Primary Examiner—Todd Ingberg
Assistant Examiner—W. D. Thomson
(74) Attorney, Agent, or Firm—William H. Bollman

(57) ABSTRACT

The present invention provides a processor device and technique having the capability of providing a two-processor solution with only one processor. In accordance with the principles of the present invention, a host processor is programmed in its native source and machine code language, and an emulated second processor is programmed in a different native source or machine code language particular to that emulated processor, to allow programming specialists in the different processors to develop common code for use on the same host processor. A multitasking operating system is included to allow time sharing operation between instructions from program code relating to the host processor (e.g., a DSP in the disclosed embodiment), and different program code relating to the emulated processor. The program code relating to the host processor (e.g., DSP) is written in program code which is native to the DSP, while the program code relating to the emulated processor (e.g., microcontroller) is written in program code which is native to the microcontroller. The SoftCore emulation module allows both DSP code and control code written for a microcontroller to execute independently on the same processor by multi-tasking resources in the faster, host processor (e.g., in the DSP), giving equal time slots of processor time to each processor (real and emulated).

4 Claims, 5 Drawing Sheets

U.S. PATENT DOCUMENTS

| | | | | |
|---|---|---|---|---|
| 5,748,468 A | * | 5/1998 | Notenboom et al. | 326/37 |
| 5,761,516 A | * | 6/1998 | Rostoker et al. | 709/100 |
| 5,781,792 A | * | 7/1998 | Asghar et al. | 712/203 |
| 5,790,824 A | * | 8/1998 | Asghar et al. | 712/209 |
| 5,799,169 A | * | 8/1998 | Kalapathy | 703/25 |
| 5,819,067 A | * | 10/1998 | Lynch | 703/20 |
| 5,872,993 A | * | 2/1999 | Brown | 709/200 |
| 6,032,247 A | * | 2/2000 | Asghar et al. | 712/203 |
| 6,052,773 A | * | 4/2000 | DeHon et al. | 712/229 |
| 6,163,764 A | * | 12/2000 | Dulong et al. | 703/26 |
| 6,185,522 B1 | * | 2/2001 | Bakker | 703/28 |
| 6,185,628 B1 | * | 2/2001 | Sands et al. | 375/220 |
| 6,223,274 B1 | * | 4/2001 | Catthoor et al. | 709/108 |
| 6,256,725 B1 | * | 7/2001 | Batten et al. | 711/5 |
| 6,272,452 B1 | * | 8/2001 | Wu et al. | 703/24 |
| 6,308,255 B1 | * | 10/2001 | Gorishek et al. | 710/104 |
| 6,374,312 B1 | * | 4/2002 | Pearce et al. | 710/23 |

* cited by examiner

DSP EMULATING A MICROCONTROLLER

BACKGROUND OF THE INVENTION

1. Field of the Invention

This invention relates generally to processors. More particularly, it relates to an efficient system for combining the functions of two types of processors, e.g., both a digital signal processor and a controller.

2. Background of Related Art

As electronic circuitry in general, and telephone systems in particular, become more advanced, design implementations for the various designs typically make use of two separate processors working in conjunction with one another. One of these processors is invariably a Digital Signal Processor (DSP) which is typically responsible for running logic necessary for signal processing and related tasks, and the other is a suitable controller (e.g., a microcontroller) focused on the overall control of the device.

FIG. 5 shows a conventional two-processor device including both a digital signal processor (DSP) and a microcontroller, each having its own program code.

In particular, in FIG. 5, a device 200 such as a telephone device (e.g., telephone answering device, etc.) includes both a DSP 202 and a microcontroller 204. The DSP 202 communicates information to and from the microcontroller 204 via a suitable communication interface 206, e.g., a serial or parallel communication interface.

DSP program code 210 is stored in memory accessible to the DSP 202, and microcontroller code 212 is stored in memory accessible to the microcontroller 204.

A controller in a two-processor system, e.g., the microcontroller 204, typically runs as a 'master' processor of the system, taking care of the control of the peripherals in the device or system 200. A second processor, often a DSP 202, runs in a 'slave' mode, mastered by the microcontroller 204. Using communications between the DSP 202 and the microcontroller 204 provided by the communication interface 206, appropriate signal processing tasks are typically handled by the DSP 202 operating as a slave device, while 'feature code' for the system 200 typically runs on the microcontroller 204 operating as a master device.

An example of a suitable microcontroller 204 often used in a two-processor system is the industry standard microcontroller known as the "8051" microcontroller, which is commercially available in various forms from, e.g., Intel™ and Phillips™.

The 8051 microcontroller is, and has been for nearly two decades, popular among the micro-controller solution provider community. As a result, the 8051 is well supported in the industry, having advanced tools available such as assemblers, C compilers, etc. Moreover, code fragments are widely available for the 8051, e.g., from various sources over the Internet.

In many applications such as that depicted in FIG. 5, the DSP 202 is the center of operations. However, as pressures for reduced cost and smaller size persist, design solutions tend toward use of only one processor, e.g., toward use of only the DSP 202. In such applications, control responsibilities of what would otherwise fall within the requirements of the microcontroller 204 in the two-processor solution are left for the DSP 202 alone to handle in the one-processor solution. Moreover, the software code written for the DSP 202 need control peripheral components and run feature code apart from carrying out its more traditional responsibilities typically associated with standard signal processing tasks. Such control tasks, most efficiently handled by a suitable microcontroller but instead implemented on a DSP in a one-processor device, tend to become cumbersome and inefficient when implemented in DSP code.

For instance, the instruction set of a DSP, while optimized to efficiently encode signal processing algorithms, typically requires an excessive amount of code to handle control functions. This is disadvantageous by its very nature, particularly in the case of one-processor solutions wherein code memory space that a programmer can use is at a premium. This is especially true with low end microcontrollers. Moreover, programmers more conversant with DSP code development may find control tasks somewhat "unfamiliar", and vice versa.

There is thus a need for a more efficient technique and apparatus for combining the functions traditionally accomplished by two types of processors, e.g., a digital signal processor and a controller, such that programmers will program efficiently, and generate code easily and with minimum size requirements will be at a minimum.

SUMMARY OF THE INVENTION

In accordance with the principles of the present invention, a two processor solution using only one processor comprises a host processor, and a run-time emulation module implemented for emulation of an emulated processor different from the host processor, within the host processor. An operating system allows substantially simultaneous operation of a first program written in host processor code to operate in the host processor and a second program written in processor code for the emulated processor, the host processor code being substantially different from the emulated processor code.

A method of implementing two software programs written in different native languages to be operated on a single processor in real time in accordance with another aspect of the present invention comprises providing a digital signal processor, and a run-time emulation module in the digital signal processor to emulate an emulated processor within the digital signal processor. Program code associated with the digital signal processor is stored in a first portion of program memory accessible by the digital signal processor. Program code associated with the emulated processor is stored in a second portion of the program memory. A host line of program code is retrieved and executed for the digital signal processor, and an emulated line of program code is retrieved and executed for the run-time emulation module.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a processor device and technique having the capability of providing a two-processor solution with only one processor. In accordance with the principles of the present invention, a host processor is programmed in its native source and machine code language, and an emulated second processor is programmed in a different native source or machine code language particular to that emulated processor, to allow programming specialists in the different processors to develop common code for use on the same host processor.

While the present invention relates equally to all types of processors, it is particularly applicable, and is disclosed with respect to, a digital signal processor (DSP) as a host processor, and a run-time emulated microcontroller based in software within the same DSP.

Figure 1:
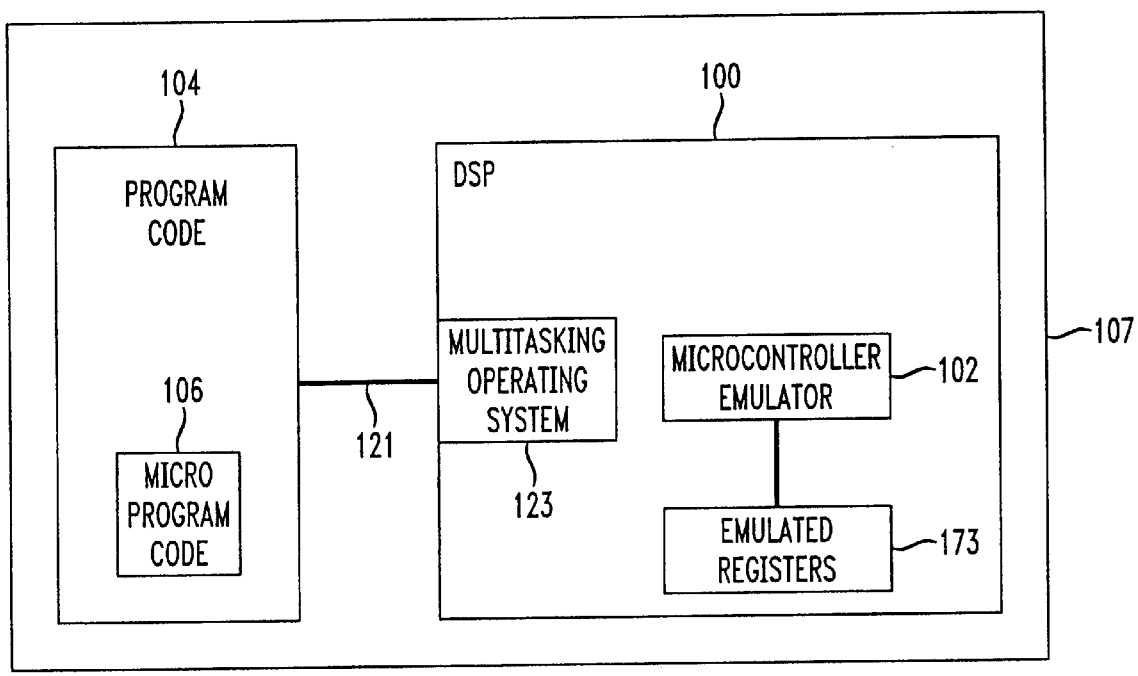
FIG. 1 shows the implementation of code for an emulated processor, e.g., a microcontroller, within and coexisting with code for an actual processor, e.g., a digital signal processor, together with a multitasking operating system, in accordance with the principles of the present invention.

FIG. 1 shows the implementation of program code for an emulated processor, e.g., a microcontroller, within and coexisting with code for an actual processor, e.g., a host DSP, together with a multitasking operating system to allow virtually simultaneous operation of both the host processor and the emulated processor, in accordance with the principles of the present invention.

In particular, in FIG. 1, a system circuit (e.g., a telephone system circuit) 107 includes a single processor 100. In the given example the single processor 100 is a DSP. The DSP 100 is serviced by a block of program code 104, which communicates with the DSP 100 using an otherwise conventional program code bus 121.

The processor (e.g., DSP) 100 further includes a real-time emulation module 102, referred to herein as a "SoftCore". The SoftCore in the disclosed embodiment provides emulation of a processor different from that of the host processor, e.g., of a microcontroller, using its own program code distinct from that of the host processor.

A multitasking operating system 123 is included to allow time sharing operation between instructions from program code 104 relating to the host processor (e.g., a DSP in the disclosed embodiment), and different program code 106 relating to the emulated processor 102. The program code 104 relating to the host processor (e.g., DSP) is written in program code which is native to the DSP, while the program code 106 relating to the emulated processor (e.g., microcontroller) is written in program code which is native to the microcontroller.

To simplify the architecture, the program code memory 104 may include program (i.e., machine) code for both the host processor (e.g., the DSP) 100 as well as for the emulated processor (e.g., the microcontroller) 102. However, the native program code for each of the respective processors (real and emulated) may be maintained in separate memory devices and/or locations.

In accordance with the principles of the present invention, the run-time emulation module 102 includes efficient instruction sequences fine-tuned to implement individual instructions in the native language of the emulated processor. In this way, the emulated processor, e.g., the microcontroller, is programmed using its own native programming language, while the host processor, e.g., the DSP, is programmed in its native programming language.

Thus, the present invention incorporates a software-based run-time emulation module 102 of a particular processor (e.g., microcontroller) within the hardware core of a different processor (e.g., a DSP). The run-time emulator 102 executes native microcontroller instructions on a virtual microcontroller core formed by an emulator module 102 and a program code area 106 including related (e.g., microcontroller) program code.

Preferably, the run-time emulator module 102 exists only in the program memory 104 (e.g., ROM and/or RAM) of the host processor 100 (e.g., DSP), such that the DSP 100 can be used in a conventional, single processor manner should the application not require a two-processor solution.

To this end, emulated registers 173 for the emulated processor can be formed with dedicated RAM locations in memory accessible to the host processor (e.g., DSP) 100. For instance, an accumulator, a program counter, a stack pointer, status registers, interrupt registers, timers, etc., , may be maintained by the run-time emulator module 102 to reflect the behavior of the actual processor being emulated upon execution of each instruction retrieved from the emulated processor program code 106.

In operation, the run-time emulator module 102 uses the emulated program counter to locate the next program instruction for the emulated processor from the emulation program code 106.

The program code 104 of the host processor and/or the program code 106 of the emulated processor may be loaded from an appropriate memory location accessible to the host processor 100, e.g., either from the internal DSP ROM or RAM location, or from external ROM or RAM, depending upon the particular application.

In accordance with the principles of the present invention, the processor program code 104 (e.g., the microcontroller program code) can be generated using conventional software development tools (i.e., compiler/assembler) by the proper software personnel (i.e., the microcontroller specialist can generate the emulated microcontroller program code while the DSP specialist can generate the DSP program code), ensuring an efficient and well written final product.

Although several instructions of the host processor (e.g., DSP) 100 will be required to execute even a single instruction of the emulated processor, the speed of the host processor (e.g., the DSP) 100 will more than make up for the increased number of instructions by nature of their faster execution speeds. Thus, depending upon the speed of the host processor 100 and where the native program instructions for the emulated processor are stored (e.g., internal or external to the host processor 100), it is possible for the SoftCore run-time emulation module 102 in accordance with the principles of the present invention to exceed the performance of its actual, real-world counterpart.

The SoftCore emulation module 102 allows both DSP code and control code written for a microcontroller to execute independently on the same processor by multitasking resources in the faster, host processor (e.g., in the DSP) 100, giving equal time slots of processor time to each processor (real and emulated). Of course, the time slots may be adjusted in accordance with priorities established by the particular application, and may even be adjusted real-time by allowing the SoftCore emulation module 102 to request additional processing time from the host processor core 100.

Thus, the present invention anticipates another embodiment wherein either or both processors (real and emulated) may request or give up time slots in a multi-tasking environment depending upon workload.

The emulated processor may even be of a proprietary design customized by the user, tailored to suit the needs of a particular application. Of course, the emulated proprietary processor will require customized tools to generate the native program code for the emulated processor.

Accordingly, a programmer specialist for a processor, e.g., a DSP, can implement DSP code while a programmer specialist for a different processor, e.g., a microcontroller, can separately and efficiently generate program code for use on the same processor.

A particular embodiment using a DSP from LUCENT TECHNOLOGIES INC. as a host processor and an emulation of a 8051 type processor, referred to herein as an "EMU8051 SoftCore" or "EMU8051" or "SoftCore" is described.

Scope of the EMU8051

The EMU8051, in its full form, may be specified as follows:

1. Central to the solution, is a run-time emulator for a 8051 microcontroller running on the DSP. This emulator functions by emulating each line of native 8051 machine code (stored as 'data' in the DSP ROM).
2. Emulation, especially in a micro-controller coding environment, necessary means that the emulated code performs the exact input-output transformation on the external world as the same program running on an 8051 based solution. This means that there is preferably a 'hardware mapping' of the external world as it might be visualized by an 8051 solution provider, on to the DSP based environment.
3. Since the signal processing code would continue to operate on the DSP, there is preferably a mechanism whereby the 'context' of execution is periodically switched back and forth between DSP code and the 8051 emulator.
4. In a development environment, the microcontroller code programmer specialist will have a development suite, e.g., PC-based. Through this suite, the microcontroller programmer will be able to 'program' the run-time emulator module 102 by downloading externally generated (through assembler, C compiler, etc) 8051 code on to the DSP's ROM (e.g., Flash ROM) meant to store the 8051 machine code as data. Additionally, the programmer will be provided with a transparent debugging environment for the downloaded 8051 code. Thus, the microcontroller code programmer will preferably be able to single-step and/or set breakpoints on the 8051 code and be able to read and/or modify 8051 register and/or memory contents from the PC based debugging environment.
5. Some features of the conventional microcontroller need not be supported by the run-time emulator module 102. For instance, external RAM addressing feature of 8051 need not be supported in the run-time emulator module 102 for particular applications. This is a reasonable limitation because in many applications, external RAM is not connected to the 8051 microcontroller. Moreover, as another example of an unnecessary function which may not need to be emulated in particular applications is the parity flag. This is because there is no instruction in the 8051 instruction set that directly accesses the parity flag (or, for that matter, any flag other than the 'carry' flag).

Context Switching between 'Normal' DSP Code and the 8051 Emulator

Switching of context between host processor (e.g., DSP) execution and execution of the emulated processor (e.g., an 8051 microcontroller) is achieved through an appropriate DSP timer ISR. For an application using a LUCENT TECHNOLOGIES INC. DSP-1650™ digital signal processor, this can be achieved using the 8 Khz timer interrupt.

The context switching is done in an 'm:n' timer-tick sharing ratio—where m and n are small numbers assumed in the design. This means that under normal operation (no 'mapped' interrupts have occurred) if the context has been switched to the normal DSP code in the present timer tick, in the next m-1 ticks, the context would remain there. However, in the next m-1 tick, context will be switched to the run-time emulator module 102. The same is true for context switching from emulator code to normal DSP code, except that the governing number is n.

The normal situation is excepted when any of the 'mapped' interrupts (see below) have been 'flagged' between the previous and the current tick and the current context happens to be that of the host processor (e.g., DSP) code. In such a case, context is immediately switched to the emulator. When that happens, host processor (e.g., DSP) code regains context only after n ticks.

The 8051 Emulator Architecture Map

Emulated Program Code Memory Map

A portion of the host processor program code 104 (e.g., the DSP ROM) is reserved for the formation of the emulated processor program code 106. In the given embodiment, since the 8051 microcontroller is a byte-organized machine, 1 word (16 bits) of DSP ROM can hold two bytes of program code for the 8051 microcontroller. However, this requires a function in the run-time emulator module 102 to 'unpack' a byte out of this area. In the given embodiment, the program code 106 for the 8051 microcontroller is 2048 bytes in size, requiring a maximum of 1024 words of 16 bit memory of the host processor (e.g., DSP Flash ROM) to be reserved for the purpose.

Data Memory and Register Map

Data memory and mapped 'special function registers' of the emulated processor are defined as a 256-byte long addressable memory area. One example is to utilize 128 words of DSP RAM to map this area, requiring logic for packing and unpacking bytes to/from this area in the emulator code. However, the RAM saving achieved thereby may not be worth the extra emulator code needed for the packing and unpacking logic in particular applications. An alternative approach would be to reserve 256 words of the host processor RAM to mark a corresponding 256 addressable bytes in the RAM of the emulated processor. This mapped area is referred to herein as "M"-a 256 sized array of words.

Input-Output Port Map

In order to fulfill assumption #2 outlined in the section on 'Scope of 8051,' the input-output ports of the 8051 microcontroller are preferably mapped to the DSP's ports in an appropriate manner. This mapping is preferably 'hard-coded' into the logic of the run-time emulation module 102. More precisely, the mapping would be hard-coded in the 'Virtualization Logic' of the run-time emulation module 102.

Timer Map

As in Input-Out port map, the timer architecture of the emulated 8051 microcontroller is mapped on to the DSP's timer architecture. This mapping is preferably 'hard-coded' into the logic of the run-time emulation module 102, e.g., into the 'Virtualization Logic' of the run-time emulator module 102.

Interrupts Map

As in Input-Out port map, the interrupt architecture of 8051 must be mapped on to the DSP's timer architecture. This mapping will be 'hard-coded' into the logic of EMU8051. More precisely, the mapping would be hard-coded in the 'Virtualization Logic' of EMU8051.

Virtualization Logic

The knowledge of the architectural mappings between the emulated processor (e.g., the 8051 microcontroller) and the host processor (e.g., the LUCENT DSP-1650) is preferably hard-coded in the virtualization logic of the run-time emulation module 102.

The working principle of the virtualization logic of the run-time emulation module 102 is as follows:

OUTPUT VIRTUALIZATION

When a line of emulated 8051 code attempts to write on one of the 8051 output ports (may be even some bit of the port), the 'port output' virtualization would take over. A port in a 8051 microcontroller is a specific address in the 'special function register' (SFR) area of the 'RAM' of the 8051. The output virtualization logic can therefore easily 'catch' such an incident.

In operation, the virtualization logic first writes the data (or bit) on to the appropriate M word (or bit). Next, it 'copies' the data (or bit) to the appropriate port of the host processor (e.g., the DSP), or bit of the appropriate DSP port, as specified in the port mapping.

INPUT VIRTUALIZATION

When a line of emulated 8051 code attempts to read from one of the 8051 output ports (may be even some bit of the port), the 'port input' virtualization would take over. A port in the 8051 is a specific address in the 'special function register' (SFR) area of the 'RAM' of 8051. The input virtualization logic can therefore easily 'catch' such an incident. The virtualization logic first reads the data (or bit) from the appropriate port of the host processor (e.g., DSP), or bit of the appropriate DSP port, as specified in the port mapping. Next, it copies the data (or bit) on to the appropriate M word (or bit).

INTERRUPT VIRTUALIZATION

As a part of the interrupt map, one or more of the DSP's interrupts are mapped on to the appropriate 8051 interrupts. Thus, whenever the DSP receives any of the above interrupts, the 8051 ISR of the emulated interrupt must be executed with minimum possible delay.

The interrupt virtualization logic 'chains before' the DSP ISR-s for each of the mapped interrupts. When the interrupt occurs, this chained code simply sets an appropriate flag and goes on to execute the DSP ISR for the interrupt.

The context switching mechanism, which is implemented through an appropriate DSP timer interrupt (e.g., the 8 Khz timer), preferably always switches context to the 8051 emulator if any mapped interrupt has occurred.

In the emulator logic, before beginning to emulate the next instruction, the interrupt flags are checked. If any of them are found set, interrupt servicing logic of the 8051 is emulated—the 8051 ISR for the mapped interrupt is 'entered'.

The maximum delay between the actual interrupt and the virtualization mechanism executing the 8051 ISR for the same is about one tick of the context switching timer. Thus, in the example of using the 8 KHz timer of the host DSP, this delay is about 125 microseconds.

TIMER VIRTUALIZATION

This can be achieved by combining port and interrupt virtualization.

Operation Logic for the Run-Time Emulation Module

The run-time emulation module 102 is preferably implemented in C (or similar) higher order source code, and then compiled into assembly language code of the host processor, e.g., into DSP code. Of course, several parts of the run-time emulation module 102 may be implemented directly in assembly language.

The reasons for choosing C as the vehicle for implementing the run-time emulation module 102 are compactness and modularity that can be achieved through programming in a high level language.

Central Logic of the Emulator

The core logic of the run-time emulation module 102 preferably runs in an infinite loop, which approximately emulates the 8051 micro-code sequencer. In each traversal of the loop, the next 8051 instruction, the one pointed to by the emulated program counter (PC), is emulated. Interrupt flags as set by the interrupt virtualization logic are checked and handled at the top of the loop.

The program memory 106 of the emulated 8051 microcontroller is preferably represented as an 'object' for the other parts of the run-time emulation module 102. This is necessary because in the given example two 'bytes' of 8051 code can be packed into one word of DSP ROM. This 'object' is loosely referred to herein as "ROM8051".

Access to this object in the given example is through one of the functions ReadNextByteOPCode( ) and ReadNextByteNOTOPCode( ). Both of these functions utilize the global (pointer) called gProgramCounter, which emulates the 8051 PC, for accessing the ROM object. That is, the 'state' of the ROM8051 object can be changed by the emulator code by modifying the variable gProgramCounter.

The emulator maintains the following global variables to keep track of several aspects:

| Variable Name | Type | Meaning |
| --- | --- | --- |
| M | 256 size Array of unsigned integers (DSP words) | This variable represents the data memory area of 8051, including the SFR area. |
| gRegBankPointer | A 'pointer' to unsigned integer. | The pointer to the 'M' location for the current register bank. Caching the same makes the emulator code more compact. Anytime the PSW gets modified, the VirtualizeOutput() function catches that and modifies this pointer accordingly. At HardwareReset(), it points to top of M. |
| gOperandPointer | A 'pointer' to unsigned integer. | The pointer to M/ROM8051 location for next operand. Since ROM locations are not accessible directly, in case the operand is in ROM (an immediate operand), it is first read by ReadNextByteNOTOPCode() into a temporary variable gTemporary2 and gOperandPointer is made to point to it. |
| gProgramCounter | Integer | The 8051 program counter into ROM. Used by the handler code of ROM to read code memory bytes. May be modified by emulator logic while handling branch instructions. |
| gTemporary1 | Unsigned Integer | Temporary variable used by the XCH instruction. |

-continued

| Variable Name | Type | Meaning |
|---|---|---|
| gTemporary2 | Unsigned Integer | Temporary used to handle immediate operands. |
| gOPCode | Unsigned Integer | The current instruction's op-code is always stored here. |
| gVirtualizeNext | Integer (Boolean) | A variable that indicates whether virtualization is necessary. |

Logic of Emulation of 8051 Instructions

The emulation code is designed to emulate the 8051 micro-program sequencer as far as possible. Aspects of the logic of the 8051 micro-program sequencer can be determined from the instruction set layout.

Many of the 8051 op-codes encode an operand inside it:
Register direct operands are encoded in the lower 3 bits, the bit 3 being 1. [Case: Lower nibble of op-code 07—OF]

If bit 3 is 0 AND bits 2 and 1 are BOTH 1, it encodes the register indirect addressing. [Case: Lower nibble=6, 7]

If bit 3 is 0, bit 2 is 1, bit 1 is 1 and bit 0 is 1, it encodes a direct address operand, where applicable. [Case: Lower nibble==5]

If lower nibble is 4, it either encodes the Accumulator or an immediate operand.

The higher nibble of the op-code denotes op-code groups. For a given group, up to 12 cases may be encoded by the lower nibble—) cases 4—F. The case 0 is either for an AJMP or an ACALL. The other cases (1, 2 and 3) and sometimes some the cases between 4 and 7 and cases described above, encode non-grouped op-codes.

The 16 major groups (encoded by the higher nibble) are:

| Group | Operation | Notes on group behavior |
|---|---|---|
| 0 | INC | All register, reg-indirect, direct and accumulator |
| 1 | DEC | All register, reg-indirect, direct and accumulator |
| 2 | ADD | All register, reg-indirect, direct and immediate |
| 3 | ADDC | All register, reg-indirect, direct and immediate |
| 4 | OR | All register, reg-indirect, direct and immediate |
| 5 | ANL | All register, reg-indirect, direct and immediate |
| 6 | XRL | All register, reg-indirect, direct and immediate |
| 7 | MOV --, #data | All register, reg-indirect, direct and accumulator |
| 8 | MOV direct, -- | All register, reg-indirect, direct and accumulator |
| 9 | SUBB | All register, reg-indirect, direct and immediate |
| A | MOV --, direct | All register, reg-indirect, direct and accumulator |
| B | CJNE | All register, reg-indirect and direct. |
| C | XCH | All register, reg-indirect and direct. |
| D | DJNZ | All register and direct. |
| E | MOV A, -- | All register, reg-indirect and direct |
| F | MOV --, A | All register, reg-indirect and direct |

Note: Of the above groups, in groups 2–6, 8, 9, B and E (total 9), the encoded operand is a source operand. In groups 0, 1, 7, A, D and F, the operand is the destination operand. In group C (XCH), the operand is both the source and the destination operand.

Figure 2:
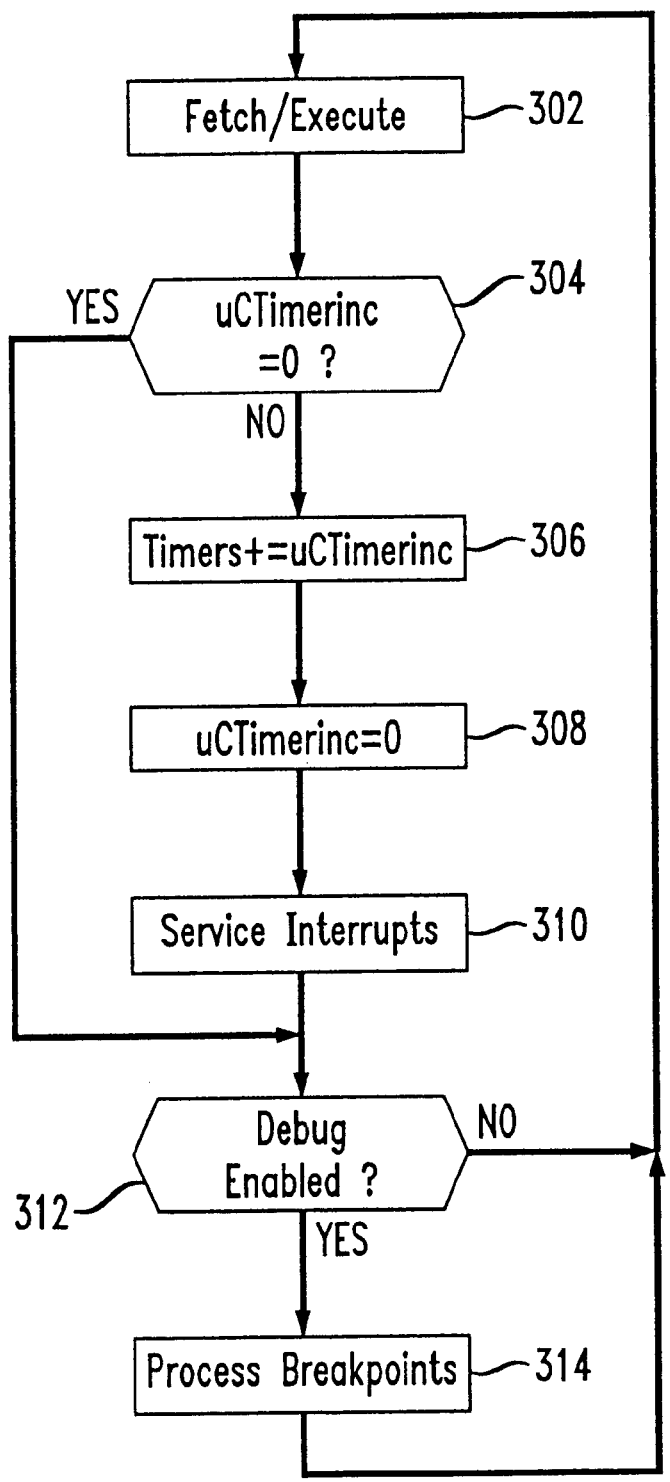
FIG. 2 shows an exemplary process flow for the central logic of the run-time emulation module shown in FIG. 1.

Preferably, the central logic of the run-time emulation module 102 runs an infinite loop, as shown in FIG. 2.

In particular, as shown in FIG. 2, at the top of the loop (after checking for interrupts), it is assumed that the program counter value is correctly stored in gProgramCounter. The op-code is read, using ReadNextByteOPCode( ). Depending upon the higher nibble of the op-code, the appropriate (one out of 16) group handler function is called.

In a group handling function, the lower nibble of op-code is first checked to find whether it denotes a group instruction or not. If yes, one of the two auxiliary functions OperandPointerAccDirIndReg( ) or OperandPointerImmDirindReg( )make the variable gOperandPointer point to the operand. Both of these functions appropriately set the virtualization flag. The group operation is carried out on the operand through gOperandPointer only, preceding the operation by virtualization (if needed) where operand is source, and succeeding by virtualization if operand is a destination one.

Non-group instructions have to be individually handled (either in the group function, or in the main loop, or both).

Figure 3:
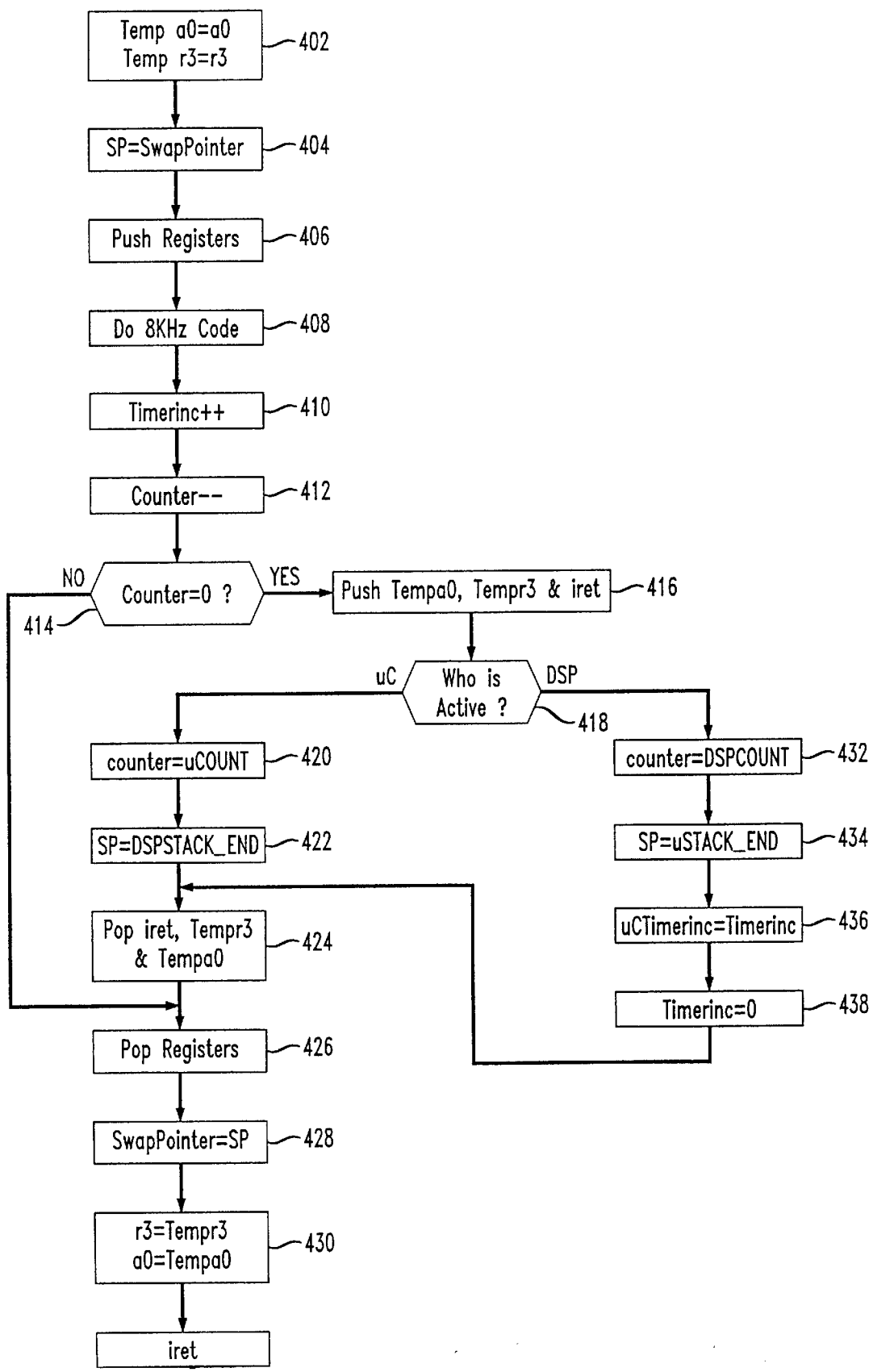
FIG. 3 shows an exemplary process flow for a suitable interrupt in the host processor (e.g., in the DSP), implemented in the disclosed embodiment using an 8 KHz audio interrupt in the DSP-1650 commercially available from LUCENT TECHNOLOGIES INC., in accordance with the principles of the present invention.

FIG. 3 shows an exemplary process flow for a suitable interrupt in the host processor (e.g., in the DSP), implemented in the disclosed embodiment using an 8 KHz audio interrupt in the DSP-1650 commercially available from LUCENT TECHNOLOGIES INC., in accordance with the principles of the present invention.

Figure 4:
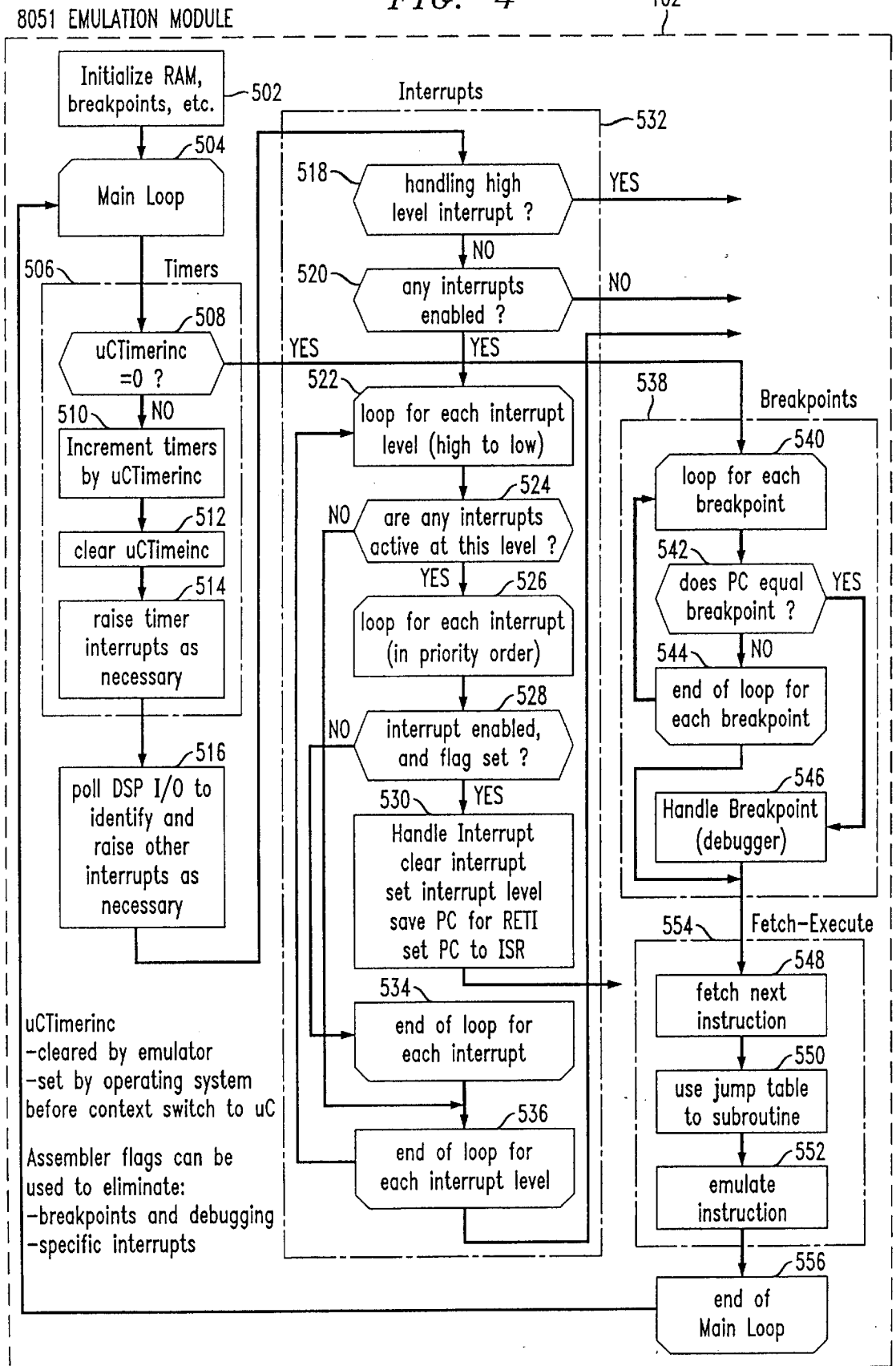
FIG. 4 shows a more detailed flow diagram of an embodiment of an emulation module for emulating an 8051 type microcontroller, in accordance with the principles of the present invention.
Figure 5:
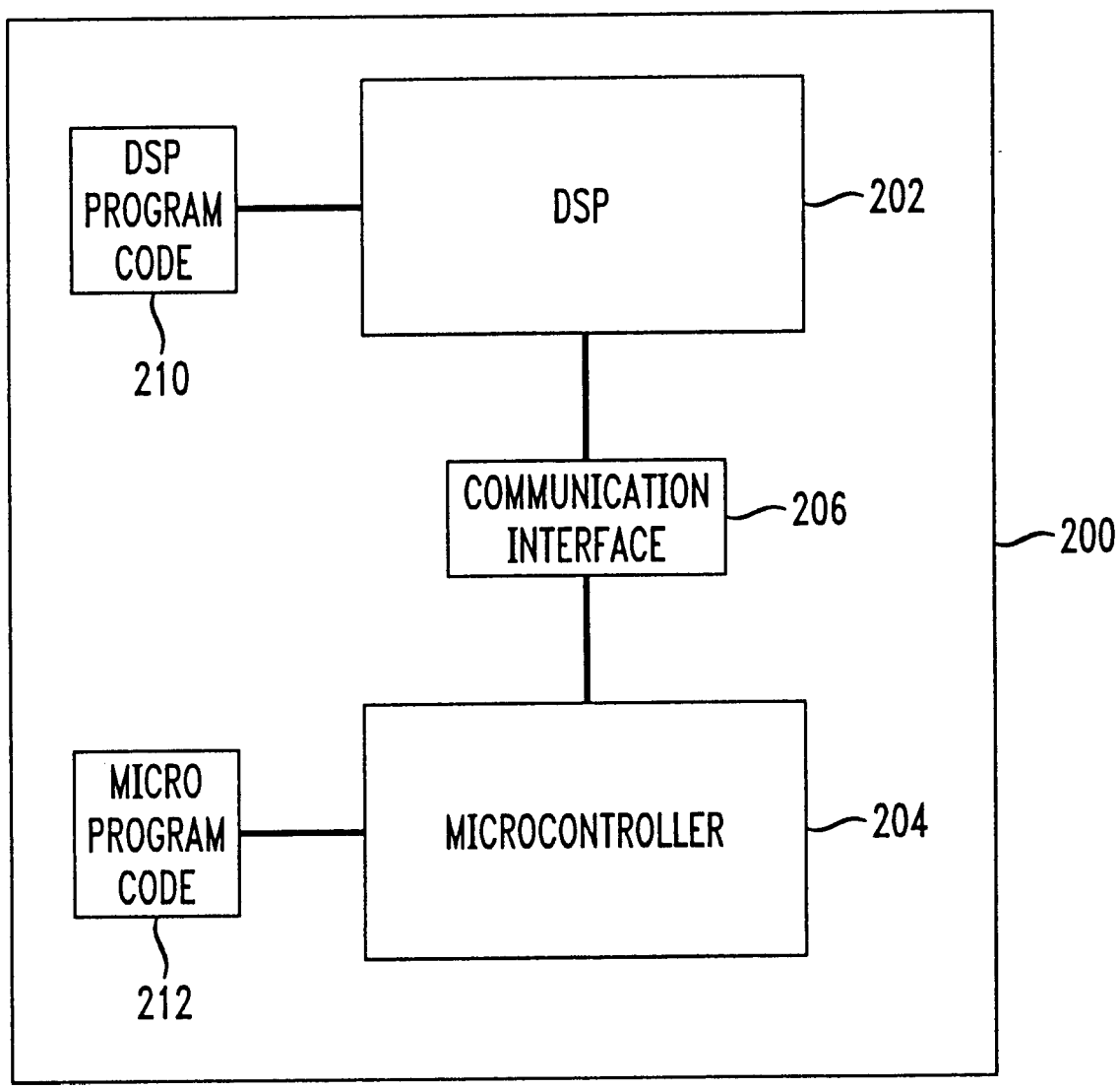
FIG. 5 shows a conventional two-processor device including both a digital signal processor (DSP) and a microcontroller, each having its own program code.

FIG. 4 shows a more detailed flow diagram of an embodiment of an emulation module for emulating an 8051 type microcontroller, in accordance with the principles of the present invention.

Implementation of the SoftCore within a host processor in accordance with the principles of the present invention provides the advantages of a reduced bill of materials, a reduced size in control code due to the efficiency of emulated instructions, elimination of the need for control code programmers to learn and master DSP coding and/or control code features using DSP code, reduced time for the development cycle of control code using efficient microcontroller C compilers (generally more limited for DSPs, if available at all for the particular DSP), and/or reduced complexity in the software by separating the control code from the general DSP code.

While the invention has been described with reference to the exemplary embodiments thereof, those skilled in the art will be able to make various modifications to the described embodiments of the invention without departing from the true spirit and scope of the invention.

What is claimed is:

1. A two processor solution using only one processor, comprising:
   a host processor;
   a run-time emulation module implemented for emulation of an emulated processor different from said host processor, within said host processor; and
   an operating system allowing concurrent operation of a first program written in host processor code to operate in said host processor and a second program written in processor code for said emulated processor, said host processor code being substantially different from said emulated processor code;
   wherein said emulated processor is an emulation of an 8051 type microcontroller and said host processor is a digital signal processor.

2. Apparatus for implementing two software programs written in different native languages to be operated on a single processor in real time, comprising:
   digital signal processor means;
   run-time emulation means for emulating a processor within said digital signal processor means;
   means for storing program code associated with said digital signal processor means in a first portion of program memory accessible by said digital signal processor means;

storing program code associated with said emulated processor in a second portion of said program memory; and retrieving and executing a host line of program code for said digital signal processor means; and retrieving and executing an emulated line of program code for said run-time emulation means.

3. The apparatus for implementing two software programs written in different native languages to be operated on a single processor in real time according to claim 2, further comprising:

means for unpacking said emulated line of program code subsequent to retrieval and prior to said executing of said emulated line of program code.

4. The apparatus for implementing two software programs written in different native languages to be operated on a single processor in real time according to claim 2, wherein:

said program memory is internal to said digital signal processor means.

* * * * *